(12) United States Patent
Lawrence

(10) Patent No.: US 8,498,925 B2
(45) Date of Patent: Jul. 30, 2013

(54) PUBLIC OFFERING RISK MANAGEMENT

(75) Inventor: David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 0 days.

(21) Appl. No.: 13/303,501

(22) Filed: Nov. 23, 2011

(65) Prior Publication Data

US 2012/0072332 A1 Mar. 22, 2012

Related U.S. Application Data

(63) Continuation of application No. 10/801,238, filed on Mar. 15, 2004, now Pat. No. 8,126,800.

(60) Provisional application No. 60/454,817, filed on Mar. 14, 2003.

(51) Int. Cl.
*G06Q 40/00* (2006.01)
(52) U.S. Cl.
USPC .................................. 705/37; 705/35
(58) Field of Classification Search
USPC ..................................... 705/35, 37
See application file for complete search history.

(56) References Cited

U.S. PATENT DOCUMENTS

| | | | |
|---|---|---|---|
| 2001/0021923 A1 | 9/2001 | Atkinson et al. | |
| 2001/0042041 A1* | 11/2001 | Moshal et al. | 705/37 |
| 2001/0049647 A1* | 12/2001 | Sheehan et al. | 705/37 |
| 2002/0010669 A1* | 1/2002 | Street | 705/36 |
| 2002/0016758 A1 | 2/2002 | Grigsby | |
| 2002/0035534 A1* | 3/2002 | Buist et al. | 705/37 |
| 2002/0049664 A1* | 4/2002 | Hoffman et al. | 705/37 |
| 2002/0069161 A1* | 6/2002 | Eckert et al. | 705/38 |
| 2002/0099646 A1* | 7/2002 | Agarwal et al. | 705/37 |
| 2002/0107779 A1* | 8/2002 | Maltzman | 705/37 |
| 2002/0174060 A1 | 11/2002 | Friedland et al. | |
| 2004/0054551 A1* | 3/2004 | Ausubel et al. | 705/1 |
| 2005/0091140 A1* | 4/2005 | Sloan et al. | 705/37 |

OTHER PUBLICATIONS

Bookbuilding vs. ficed price: An analysis of competing strategies for marketing IPOs. Lawrence M. Benveniste, W lid Y. Busaba. Journal of Financial and Quantitative Analysis. Seattle: Dec. 1997. vol. 32, Iss. 4; p. 383, 21 pgs.
Entrepreneur Fall 1995.
HKEx Listing Decision (Nov. 2004).

(Continued)

*Primary Examiner* — William Rankins
(74) *Attorney, Agent, or Firm* — Perkins Coie LLP

(57) ABSTRACT

The present invention provides an auction system that allows IPO sales to be offered in an open and transparent manner, wherein, a certain percentage (up to 100%) of shares in an IPO can be offered to qualified bidders at a "buy now" pre-auction price, set by an issuer and/or underwriter. Investors can be allowed to "bid some shares out of the auction process" and thus guarantee those investors' allocation while also allowing bidders to participate in an open auction for other shares. Shares of stock to be offered in an IPO can include a subset of pre-auction price shares and a subset of auction price shares. The pre-auction price shares are offered to pre-auction bidders at a pre-auction price, and auction shares are generally sold to the highest bidder. Pre-auction sales can serve as a catalyst for generating enthusiasm for an associated IPO auction.

20 Claims, 8 Drawing Sheets

OTHER PUBLICATIONS

International Preliminary Search Report on Patentability and Written Opinion of the International Searching Authority mailed on Apr. 27, 2005 from International Application No. PCT/US2004/008493.

'It was a moment of magic':; [Toronto Edition]. Sarah Scott. National Post. Don Mills, Ont.: Mar. 15, 2003.

* cited by examiner

| S-K DATA 702 | PRE-AUCTION SHARE BIDDERS 704 | PRE-AUCTION SHARE PRICE 706 | RESERVE AMOUNT 708 |
|---|---|---|---|
| BUSINESS | XYZ CORP. | $###.## | $###.## |
| SECURITIES | ABC INVESTOR | $###.## | $###.## |
| FINANCIAL INFORMATION | LMN INVESTOR | $###.## | $###.## |
| INDUSTRY GUIDES | QRS FUND | $###.## | $###.## |
| AUDIT DATA | JK FUND | $###.## | $###.## |

FIG. 7

PUBLIC OFFERING RISK MANAGEMENT

CROSS-REFERENCE TO RELATED APPLICATIONS

This application is a continuation of and claims priority under 35 U.S.C. § 120 to prior U.S. patent application Ser. No. 10/801,238, filed Mar. 15, 2004, now U.S. Pat. No. 8,126,800 entitled "Public Offering Risk Management," which claims the benefit of provisional application entitled "Public offering risk management," filed Mar. 14, 2003, bearing the Ser. No. 60/454,817, the contents of which are each relied upon and expressly incorporated by reference.

BACKGROUND

This invention relates generally to methods and systems for facilitating allocation of shares of stock issued during an initial public offering (IPO). In particular, the present invention relates to methods and systems of making shares available through pre-auction and auction processes.

The capital markets in a country such as the United States may be the most sophisticated and regulated in the world. Nonetheless, the current IPO allocation system has resulted in examples of abuse and financial scandal. Commentators and investigators have referred to the current system of allocation as archaic, and have defined it in Marxian terms: "to each according to his clout." Reliance upon the current system has compromised, on a cross-divisional basis, the integrity of many leading financial firms. Few issues have so effectively placed into question the ethics of investment banking, capital markets, equities trading, wealth management and the top executives of investment banks and their clients.

Under the current system, government, legislative and media investigators, class action attorneys and the public are currently questioning whether executives at numerous companies were effectively being bribed in return for their investment banking business. It appears that lucrative business was awarded because undervalued IPO shares were sold to important decision makers and converted into fast and relatively risk-free profits for those decision makers.

Concomitantly, these same lines of inquiry pursue the award of "cheap shares" to favored institutional and other clients. They have sought to draw the link between these awards and an agreement to pay higher commissions and purchase shares at pre-arranged higher prices. This has been cast as a market manipulation scheme that induced an unsuspecting public to buy shares at inflated prices. Essentially, it has been cast as a rigged system that allowed "friends" and insiders to reap quick profits.

Weaknesses in the current system have resulted in significant fiduciary questions relating to the relationship between investment banks and issuers. The implications of these questions have been played out in class action litigations, the opinions of commentators and proposed regulations. An argument advanced is that underwriters have systematically under-priced shares in order to ensure a "hot offering slush fund" for favored clients. This system of pricing and allocation has worked to the direct detriment of issuers who have lost valuable capital. In recent litigation, depressed and bankrupt firms (and their shareholders) have claimed that the loss of this capital perpetrated a fraud against issuers and contributed to the failure of a number of companies. As has been noted by class action counsel and commentators: investment bankers celebrate a "hot" offering that reaps instant profits for the chosen, when in the opinion of some, the bankers should instead refund their fees for ineffective pricing.

Regulators are proposing complex rules to restrict what investment banks can do with this "free money." The proposed rules portend to reflect precisely the perspectives that contributed to the current crisis and the continuing investigations, litigation and loss of public confidence in our markets.

This present situation has international implications. The current system is an invitation to continued corruption. Over the last decade, U.S. exchanges, investment banks and the U.S. government have preached the benefits of the free market. The best hope for economies is to allow companies to act in an open and transparent market that sets prices on a competitive basis, free of corruption. The current system has proven to be an anathema to this philosophy.

What is needed is a way to mitigate corruption risks and serve to restore investor confidence in investment banking, capital markets and wealth management relationships.

SUMMARY

Accordingly, the present invention provides methods and systems to address an IPO allocation and to help ensure that fiduciary obligations to issuers, institutional and individual investors, shareholders and regulators are met. A unique auction process is provided that can facilitate maximization of capital-raising opportunities; transparency on initial pricing and allocation decisions; uniform and equitable allocation decisions; operation and appearance of a process that is less vulnerable to manipulation, conflicts, tie-in arrangements and self-dealing; obviation of client demands, threats and complaints about not getting their "fair share"; and lessened exposure to enforcement and litigation risk.

The present invention provides an auction system that allows IPO sales to be offered in an open and transparent manner, wherein, a certain percentage (up to 100%) of shares in an IPO can be offered to qualified bidders at a "buy now" pre-auction price, set by an issuer and/or underwriter. The present invention therefore allows investors to "bid some shares out of the auction process" and thus guarantee their allocation and also allow bidders to participate in an open auction for other shares.

The present invention can also include allocation and pricing that is based upon demand thereby minimizing risks associated with under-pricing, kickbacks and non-level playing fields. The interests of banking, trading and investment clients can be protected in a transparent fashion with fewer inherent conflicts. Regulatory concerns can be largely addressed in a commercially acceptable manner. The present invention provides a means for regulatory and public concerns to be heeded in a practical and intelligible way. A reserve or an upset price can be set for purposes of ensuring that minimum capital raising targets are met. In some embodiments, bidders can be pre-qualified before participating to determine investor suitability, investment objectives and prior histories.

Some embodiments of the present invention can include a computerized system, executable software, or a data signal implementing the inventive methods of the present invention. The computer server can be accessed via a network access device, such as a computer. Similarly, the data signal can be operative with a computing device, and computer code can be embodied in a computer readable medium.

Various features and embodiments are further described in the following figures, drawings and claims.

DESCRIPTION OF THE DRAWINGS

FIG. 7 illustrates an exemplary data structure that can be utilized to implement certain aspects of the present invention.

DETAILED DESCRIPTION

The present invention provides methods and systems to address an IPO allocation and help ensure that fiduciary obligations to issuers, institutional and individual investors, shareholders and regulators are met.

Overview

A unique auction process is provided that can facilitate maximization of capital-raising opportunities; transparency on initial pricing and allocation decisions; uniform and equitable allocation decisions; operation and appearance of a process that is less vulnerable to manipulation, conflicts, tie-in arrangements and self-dealing; obviation of client demands, threats and complaints about not getting their "fair share"; and lessened exposure to enforcement and litigation risk.

The present invention provides an auction system that allows IPO sales to be offered in an open and transparent manner, wherein, a certain percentage (up to 100%) of shares in an IPO can be offered to qualified bidders at a "buy now" pre-auction price, set by an issuer and/or underwriter. The present invention therefore allows investors to "bid some shares out of the auction process" and thus guarantee their allocation and also allow bidders to participate in an open auction for other shares.

The present invention can also include allocation and pricing that is based upon demand thereby minimizing risks associated with under-pricing, kickbacks and non-level playing fields. The interests of banking, trading and investment clients can be protected in a transparent fashion with fewer inherent conflicts. Regulatory concerns can be largely addressed in a commercially acceptable manner. The present invention provides a means for regulatory and public concerns to be heeded in a practical and intelligible way. A reserve or an upset price can be set for purposes of ensuring that minimum capital raising targets are met. In some embodiments, bidders can be pre-qualified before participating to determine investor suitability, investment objectives and prior histories.

Figure 1:
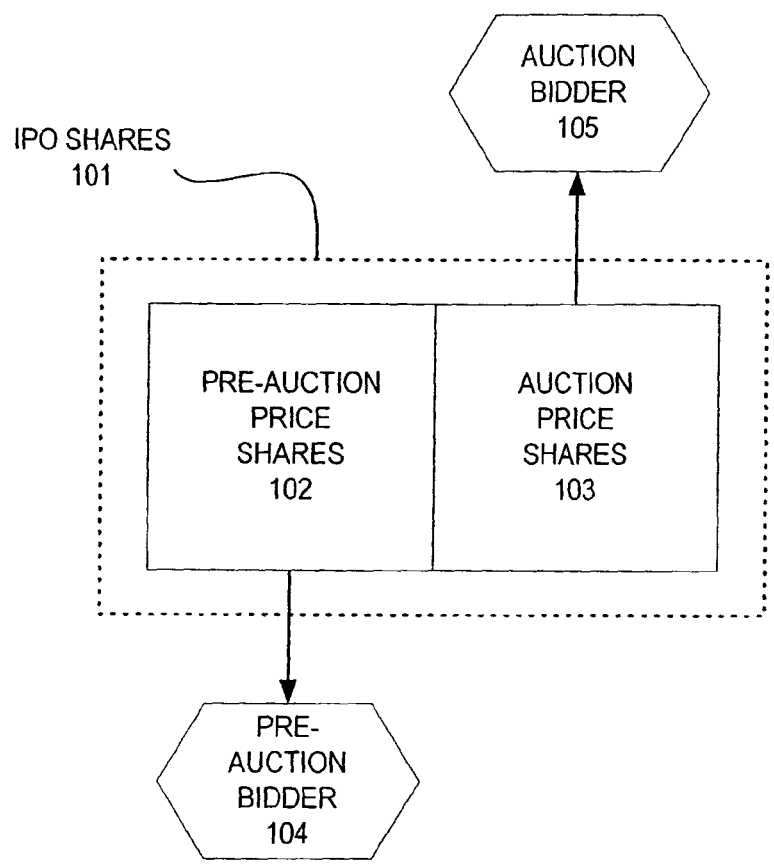
FIG. 1 illustrates block diagrams of some embodiments of the present invention.

Referring now to FIG. 1, a block diagram of one embodiment of the present invention is illustrated. Shares of stock to be offered in an IPO 101 can include a subset of pre-auction price shares 102 and a subset of auction price shares 103. The pre-auction price shares 102 are offered to pre-auction bidders 104 at a pre-auction price, and auction shares are generally sold to the highest bidder. Pre-auction sales can serve as a catalyst for generating enthusiasm for an associated IPO auction. The auction itself can be conducted using techniques similar to those known in the industry for auctioning financial instruments.

The IPO shares 101 can include a predetermined number of shares of stock that will be made public in the IPO transaction. A reserve price or upset price to be received in return for the IPO shares can be set for purposes of ensuring that minimum capital raising targets are met.

The number of pre-auction price shares 102 can be determined according to details relating to the IPO, such as market conditions and investor interest. For example, the market may be eager to participate in an IPO relating to a particular industry. With investor interest in the IPO relatively high, a subset of pre-auction price shares 102 may be relatively low (for example, 40% of all shares to be offered), and underwriters may be confident that auction of the auction price shares 103 will easily generate sales sufficient to meet the reserve. In a different example, market interest may be lessened, or a reserve may seem more difficult to meet. In this example, a higher proportion of IPO shares 101 may be designated as pre-auction price shares 102 and offered to significant investors with a prior history that indicates interest in a pertinent stock type, or with investment objectives that can be well served by the purchase of the pre-auction price shares 102.

A level of participation in the sale of pre-auction shares 102 can also serve as a benchmark for investors who have an interest in participating in the auction as auction bidders 105. Credibility associated with larger, pre-qualified pre-auction bidders 104 can generate enthusiasm for IPO shares 101 that will be offered at auction. In addition, a pre-auction price for shares 101 can be useful in determining a reasonable price to be bid during an auction.

Methods

Figure 2:
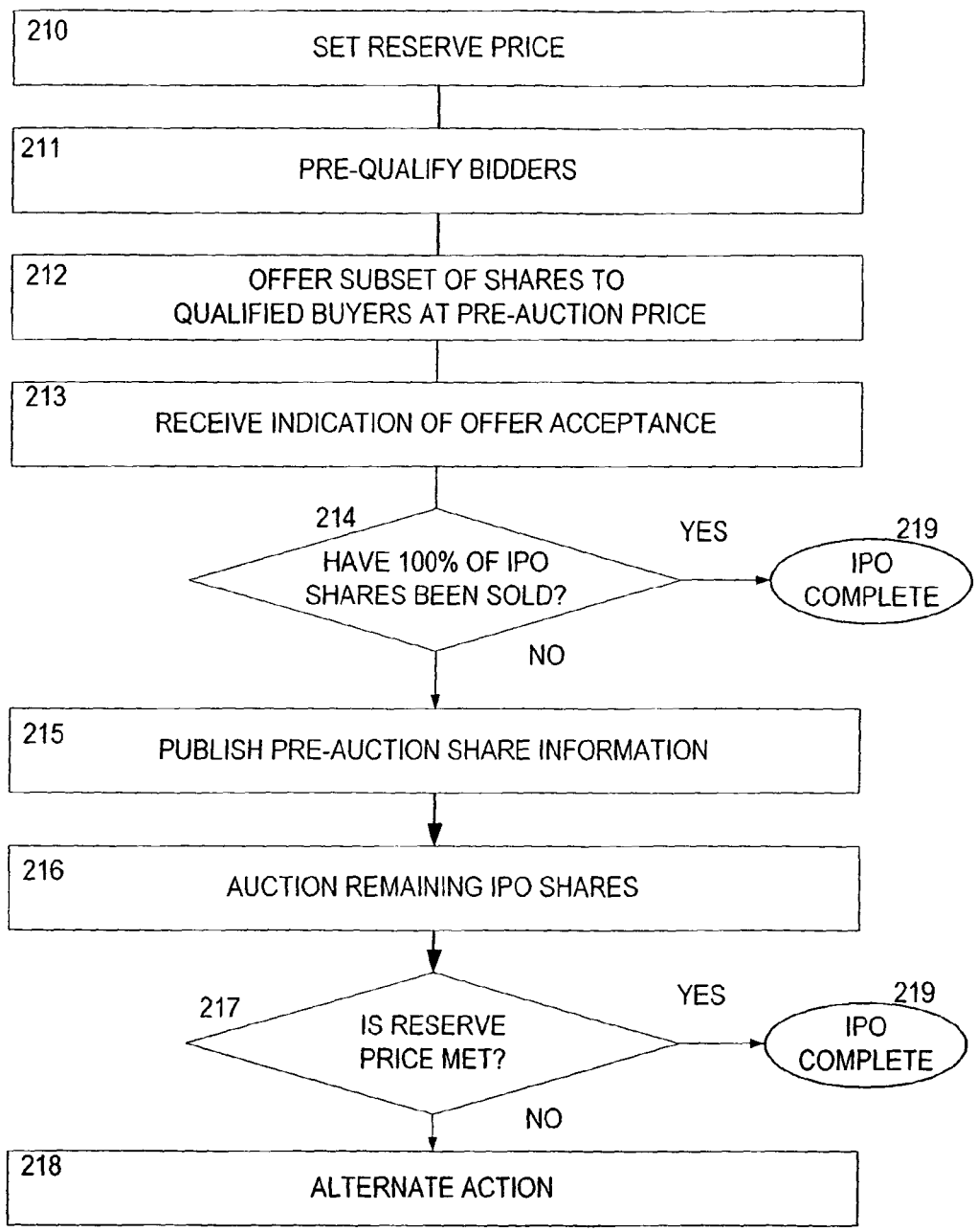
FIG. 2 illustrates a flow chart of exemplary steps that can be executed while implementing some embodiments of the present invention.

Referring now to FIG. 2, steps that can be performed while practicing the present invention are illustrated, the steps are presented as they may be practiced, although no particular order is required. Accordingly, any order should not limit the scope of the invention.

At 210 a reserve price may be set. The reserve price, or upset price, can include a threshold amount, such as a minimum capital raising target that the issuer will accept in order to complete the IPO. The reserve amount can be determined, for example, by the issuer with the assistance of an underwriter or other investment banking assistance. At 211, bidders can be pre-qualified. Pre-qualification can include, for example, determining that potential bidder(s) 104-105 meet investor suitability guidelines, that the bidder has sufficient amounts on account or available through leveraging or other credit, that the IPO meets an investment objective of the bidder(s) 104-105, or other type of determination that would be indicative of whether a bidder should be able to participate in the IPO.

At 212, the pre-auction price shares 102 can be offered to one or more qualified pre-auction bidders 104 at a pre-auction price. Embodiments can include, for example, offering pre-auction shares to select large investors which can have the added benefit of increasing the credibility of the offering, creating demand, attention and price support for the company going public. Pre-auction price shares can be offered, for example, via an electronic communications network and trading terminals, as discussed more fully below, via hardcopy documents or any other known means of communication.

At 213, an indication of acceptance of the offer for pre-auction price shares 102 can be received. Generally, the acceptance of the offer for pre-auction price shares 102 allows buyers to bid IPO shares 101 out of the auction process and thus guarantee their allocation. The indication of acceptance can be accomplished, for example, through an electronic transaction, via execution of documents, via facsimile, voice message, or other means of communication.

At 214, it can be determined if 100% of all the IPO shares 101 have been sold in the pre-auction stage of the IPO process. Embodiments can include predetermining a portion of the IPO shares 101 which will be allocated as pre-auction price shares 102, which will also result in a predetermined portion to be allocated as auction price shares 103. Other embodiments can include letting market demand for pre-auction price shares determine what percentage, up to 100%, of the shares will be sold at the pre-auction price. Variations can also include allocating a maximum portion of shares to be sold at a pre-auction price and allowing qualified bidders to purchase, in aggregate, up to the maximum portion.

If 100% of the IPO shares have been sold, the IPO process can be completed at 219.

If 100% of the shares have not been sold, then at 215 an auction can proceed with publication of pre-auction share information. The publishing of pre-auction share information can include, for example: a number of shares that were sold at a pre-auction price, identification of the bidders who purchased shares at the pre-auction price, a number of shares purchased by each bidder at the pre-auction price, additional offers to purchase shares at the pre-auction price which were not granted, or other related information.

At 216, any IPO shares that have not been sold at the pre-auction price can be auctioned. An auction of IPO shares 101 can be conducted by adapting known auction techniques suitable for auctioning financial instruments. For example, in some embodiments, an IPO auction can include receiving multiple bids and determining a clearing bid price at which all shares included in the offering will sell. Embodiments can include a clearing price being set as the maximum price at which bids will sell. Utilizing a clearing bid price, shares can be allocated to all bidders who bid at or above the clearing price. Embodiments can also include allocating shares to a highest bidder first and then to each subsequent next highest bidder until all of the IPO shares are allocated. Still other embodiments can include a pro rata share allocation to each bidder who bids above a threshold bid amount. A unique aspect of some auctions embodying the present invention is the ability of auction participants to view data showing pre-auction interest including who purchased shares at a pre-auction price, what the pre-auction price was, and how many shares were sold at the pre-auction price. Substantial pre-auction activity can act to "prime the pump" and create interest during the auction, as well as add to due diligence on the part of auction participants. Embodiments can include auction models that build upon the demand created by the pre-auction activity and include such features as: publication of bids to create competitive bidding, bidding until a cutoff time, bidding until a threshold amount is reached, and bidding until each registered bidder has placed a bid.

At 217, embodiments can include a determination of whether a reserve price has been met by selling shares during the auction and pre-auction sales. If the reserve has been met, the IPO process can be completed at 219. If the reserve has not been met, then some alternate action can be considered. For example, if the IPO is a best efforts deal, the IPO may be cancelled if the underwriter cannot sell all of the shares. Accordingly, the underwriter may be given the opportunity to sell remaining shares, or to sell some shares at a price higher than the price bid. Actions may also include, for example, accepting a reduced value, not taking the company public, or other action.

Figure 3A:
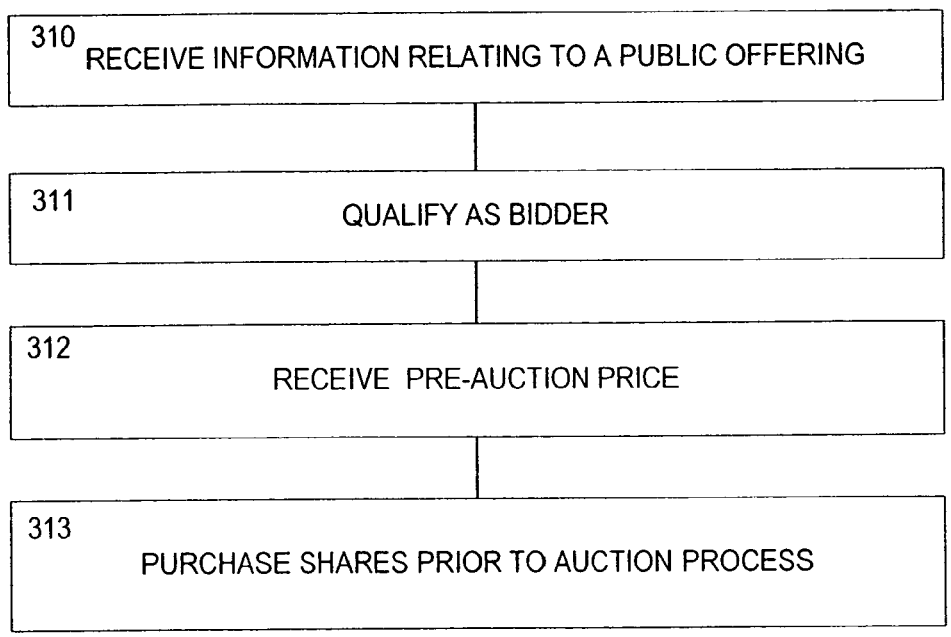
FIG. 3A illustrates a flow chart of exemplary steps from the perspective of an investor that can be executed while implementing some embodiments of the present invention.

Referring now to FIG. 3A, steps that can be performed, from a pre-auction bidder's 104 viewpoint, while practicing the present invention are illustrated. At 310, pre-auction bidder 104 can receive information relating to a public offering. The information can include, for example, a prospectus relating to the offering, including, a Red Herring prospectus, a final prospectus, SEC filings, press coverage of the company, press coverage of the offering, analyst statements, information descriptive of company officers or other significant people, financial data relating to the company, a mission statement, or other data. In some embodiments, information relating to the IPO can include a risk management search conducted by a risk management clearinghouse.

An auction bidder 105 can receive information relating to the public offering as well. As stated above, the information can include, for example, a prospectus relating to the offering, including, a Red Herring prospectus, a final prospectus, SEC filings, press coverage of the company, press coverage of the offering, analyst statements, information descriptive of company officers or other significant people, financial data relating to the company, a mission statement, or other data. In some embodiments, information relating to the IPO can include a risk management search conducted by a risk management clearinghouse.

At 311, pre-auction bidder 104 can qualify as a bidder. Qualification can include standard industry practices for opening a financial investment account and making the investor known to an entity associated with conducting the auction. In addition, qualification can include arranging for credit lines or other means of securing a bid made during an auction. Qualification as a bidder can be accomplished by procuring data descriptive of the prospective bidder and ascertaining that the buyer meets statutory and/or compliance criteria. Data can be received via online submission, hardcopy or facsimile, voice communication, or other means of communication.

At 312, the pre-auction bidder 104 can receive the pre-auction price for shares of the IPO and at 313, the pre-auction bidder 104 can bid for the IPO shares and purchase the shares at the pre-auction price. Communication of the pre-auction price for shares and a bid for the shares at the pre-auction price can be made via an electronic trading system, via an electronic messaging system, via hardcopy or facsimile documents, via a voice communication, or other communications means.

Figure 3B:
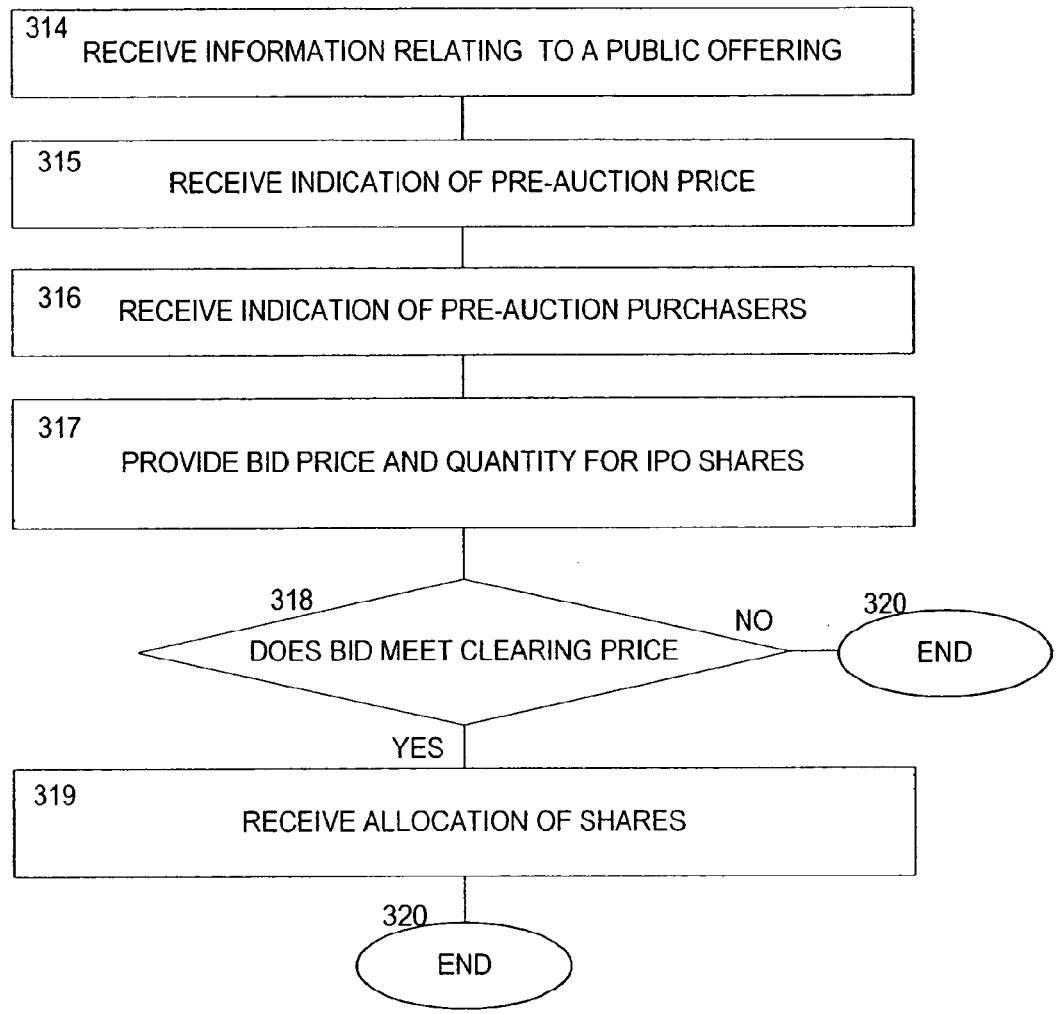
FIG. 3B illustrates a flow chart of exemplary steps from the perspective of an auction participant that can be executed while implementing some embodiments of the present invention.

Referring now to FIG. 3B, steps that can be performed while practicing the present invention, from the perspective of an auction bidder 105, are illustrated. At 314, the bidder 105 can receive information relating to the public offering. As stated above, the information can include, for example, a prospectus relating to the offering, including, a Red Herring prospectus, a final prospectus, SEC filings, press coverage of the company, press coverage of the offering, analyst statements, information descriptive of company officers or other significant people, financial data relating to the company, a mission statement, or other data. In some embodiments, information relating to the IPO can include a risk management search conducted by a risk management clearinghouse.

At 315, the bidder 105 can receive an indication of the pre-auction price, and at 316, receive an indication of who constituted the pre-auction price bidders 104. The indications of the pre-auction price and pre-auction bidders 104 can be conveyed via an online resource, such as a web page, an electronic message, a hardcopy or facsimile, a voice message or other communications means. The indications can include information setting forth a number of shares purchased by each pre-auction bidder 104. In some embodiments, an auction bidder 105 can include the information descriptive of pre-auction bids as part of the auction bidder's 105 due diligence and value assessment concerning the auction price shares 103. For example, it may be convincing to a potential bidder for respected investment entities to have purchased large numbers of shares in the IPO. It may also be useful to the auction bidders, in determining an appropriate bidding price, to know the pre-auction price paid by the pre-auction bidders 104.

At 317, the bidder 105 can provide a bid price for the IPO shares as well as a quantity of shares 103 for which the bidder 105 is bidding. The bidder 105 can convey a bid via an electronic trading system, by entering data into a graphical user interface, via hardcopy or facsimile document, via a voice communication, or other means of communication.

At 318, it can be determined if the bid meets a clearing price. The clearing price can include a minimum acceptable bid price that qualifies for receiving IPO shares. Embodiments can include, for example, a computerized system that receives a bid amount and automatically compares the amount to other bid prices and responds with an indication of whether the bid meets a minimum price to qualify for receiving auction price shares 103 included in the IPO.

At 319, if a bid does meet the clearing price the bidder 105 can receive an allocation of shares from the IPO. Allocated shares can include, for example, all auction price shares bid for at an acceptable price, a number of shares based upon a pro rata allocation of shares awarded to any bid received which at least meets a given price, or any other given method of allocation. The shares can actually be received through any method or vehicle known to the industry for delivering ownership of stock.

Systems

Figure 4:
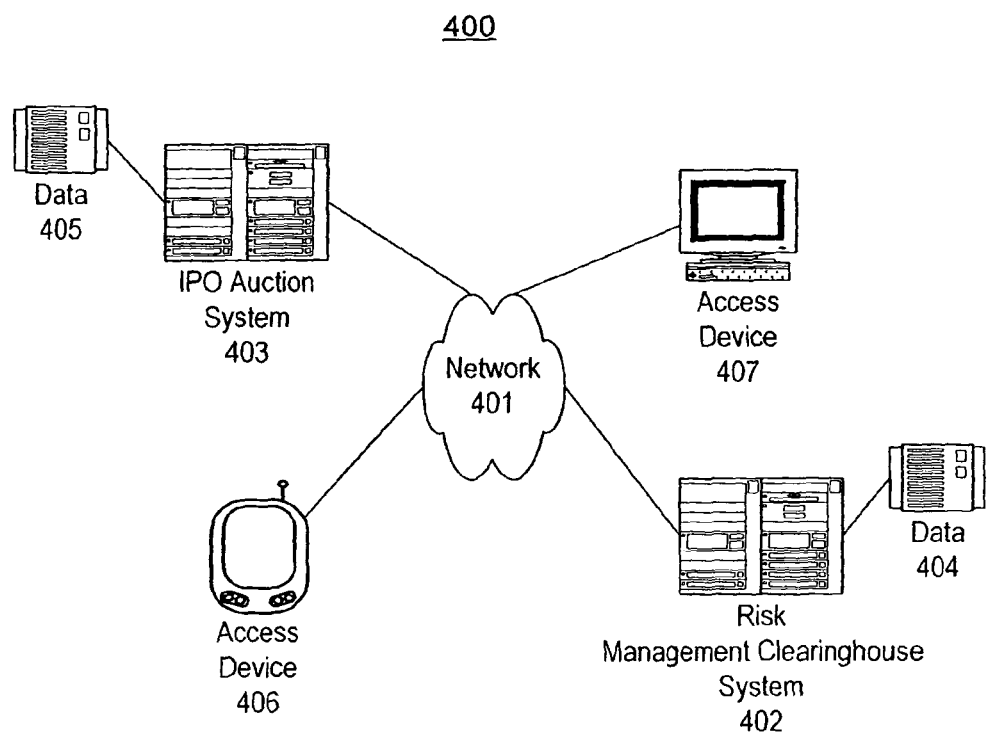
FIG. 4 illustrates a network of computer systems that can be included in some embodiments of the present invention.

Referring now to FIG. 4, a network diagram illustrating one embodiment of the present invention is shown 400. An automated IPO Auction system 403 can include a computerized server accessible via a distributed network 401 such as the Internet, or a private network. An automated risk management clearinghouse (RMC) system 402 can also include a computerized server accessible via the distributed network 401. A user can use a computerized system or one or more network access devices 406-407 to receive, input, transmit or view information processed in the IPO Auction system 403, RMC system 402, a peer device, and/or one or more other network access devices 406-407. A protocol, such as, for example, the transmission control protocol internet protocol (TCP/IP) can be utilized to provide consistency and reliability.

One or more system access devices 406-407 can communicate with the IPO Auction system 403 or RMC system 402 to access data and programs stored at the respective servers. The one or more system access devices 406-407 may interact with the IPO Auction system 403 or RMC system 402 as if the servers were a single entity within the network 400. Additionally, the IPO Auction system 403 and RMC system 402 may include multiple processing and database sub-systems, such as cooperative or redundant processing and/or database servers that can be geographically dispersed throughout the network 400.

Figure 5:
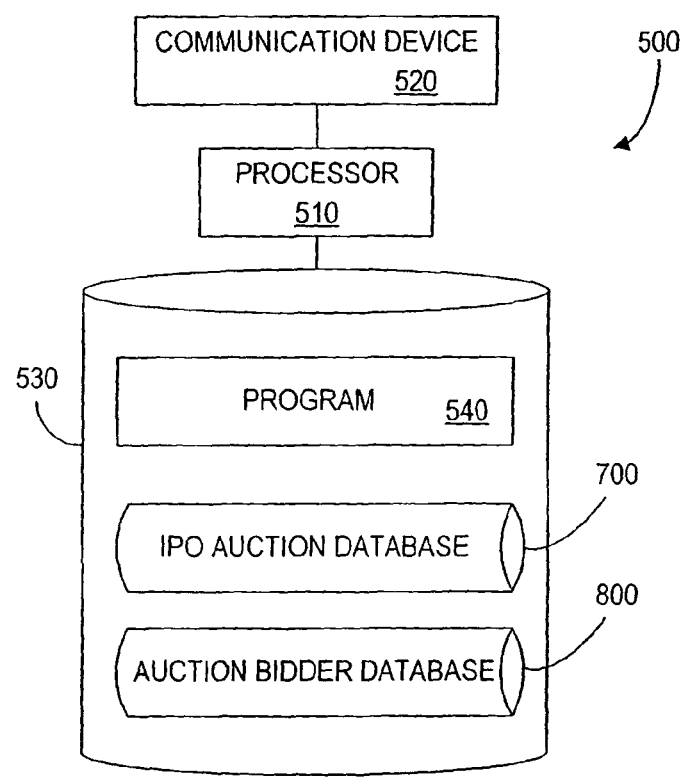
FIG. 5 illustrates a computerized device that can be utilized to implement some embodiments of the present invention.

A server utilized in a RMC system 402 and IPO Auction system 403 can include a processor, memory and a user input device, such as a keyboard and/or mouse, and a user output device, such as a display screen and/or printer, as further detailed in FIG. 5. The server can also include one or more databases 404-405 for storing data relating to an IPO, bidders, associated risks, or other pertinent information. Information relating to, and included in, an IPO can be aggregated into a searchable data storage structure. Gathering data into one or more aggregate data structures 404-405, such as a data warehouse, allows a server to have the data readily available for processing a risk management search associated with a company's earnings. Aggregated data 404-405 can also be scrubbed or otherwise enhanced to aid in searching.

Typically, one or more access devices 406-407 will access an IPO system using client software executed at the one or more system access devices 406-407. The client software may include a generic hypertext markup language (HTML) browser, such as Netscape Navigator or Microsoft Internet Explorer (i.e., a "WEB browser"). The client software may also be a proprietary browser, and/or other host access software. In some cases, an executable program, such as a Java™ program, may be downloaded from a server to the one or more system access devices 406-407 and executed at the one or more system access devices 406-407 as part of an IPO allocation system. Other implementations include proprietary software installed from a computer readable medium, such as a CD ROM. The invention may therefore be implemented in digital electronic circuitry, computer hardware, firmware, software, or in combinations of the above. Apparatus of the invention may therefore be implemented in a computer program product tangibly embodied in a machine-readable storage device for execution by a programmable processor; and method steps of the invention may be performed by a programmable processor executing a program of instructions to perform functions of the invention by operating on input data and generating output.

FIG. 5 illustrates a controller 500 that is descriptive of the one or more access devices 406-407 shown, for example, in FIG. 4, according to some embodiments of the present invention. The IPO controller 500 comprises a processor 510, such as one or more processors, coupled to a communication device 520 configured to communicate via a communication network (not shown in FIG. 5). The communication device 520 may be used to communicate, for example, with one or more network access devices 406-407.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 can store a program 540 for controlling the processor 510. The processor 510 performs instructions of the program 540, and thereby operates in accordance with the present invention. For example, the processor 510 may receive information descriptive of an IPO including auction and pre-auction details, and allocate shares according to rules defined by the details. The processor 510 may also transmit information comprising share allocation, pricing, or other information.

The storage device 530 can store IPO related data in a IPO Auction Database 700 and risk management data in a Auction Bidder Database 800, and other data as needed. The illustration and accompanying description of the IPO related database presented herein is exemplary, and any number of other database arrangements can be employed besides those suggested by the figures.

Figure 6:
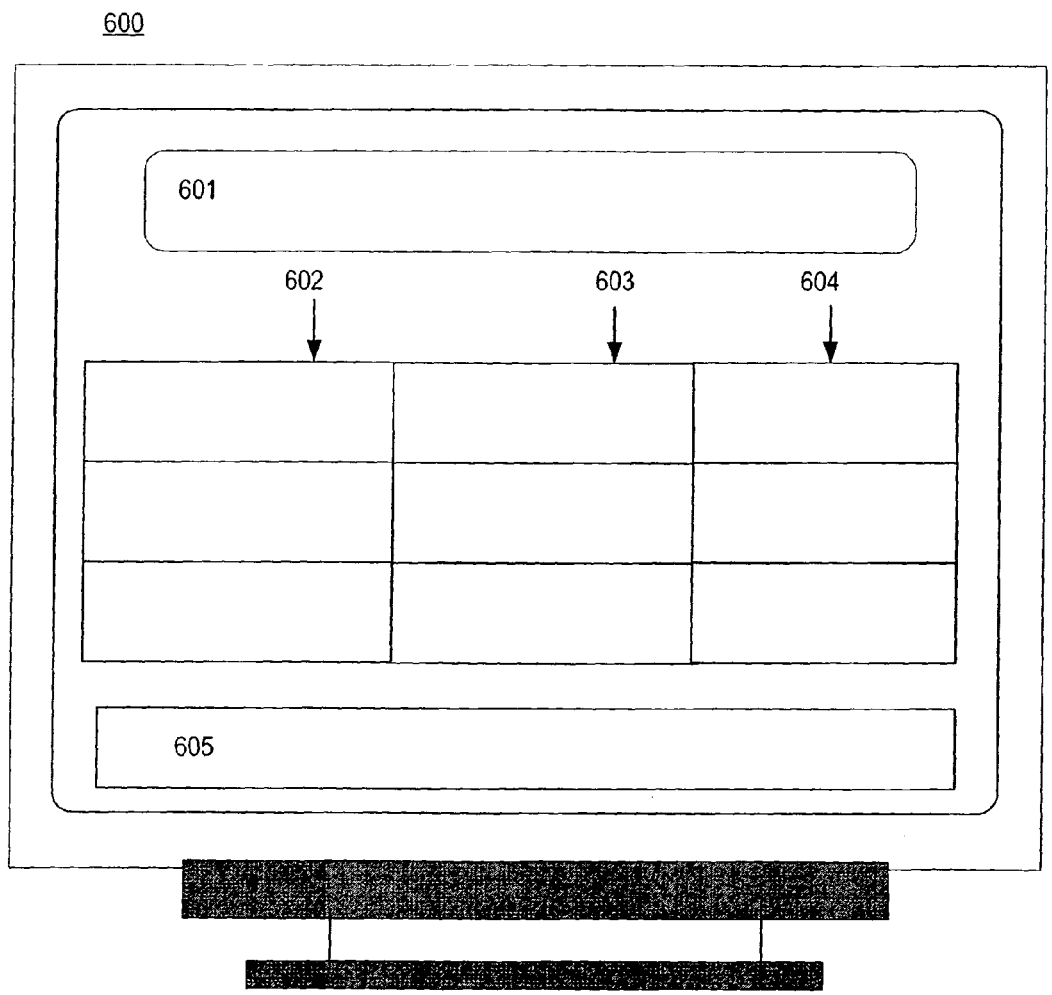
FIG. 6 illustrates an exemplary graphical user interface that can implement various aspects of the present invention.

Referring now to FIG. 6, an exemplary graphical user interface (GUI) 600 that can be utilized while practicing the present invention is illustrated. The GUI can be presented on one or more network access devices 406-407 or any other type of terminal or interactive station capable of creating a display pursuant to an electronic signal. A portion of display 601 can display information descriptive of an IPO, such as for example, a Red Herring or information included in a SEC filing. Another portion of the display 602 can include information descriptive of pre-auction pricing and pre-auction bids and/or sales. Still another portion 603 can contain information descriptive of pre-auction bidders and a portion 604 can display instructions relating to bidding for auction price shares offered in the IPO. Portions of the display 600 can also be interactive, and allow a user to input data, such as data descriptive of a bid 605 that include a bid amount and a number of shares bid on at the bid amount.

Referring now to FIG. 7, a design of a portion of a database that can be utilized while implementing the present invention is illustrated. The database 700 can include a field containing data descriptive of S-K data 702 as well as a field containing data descriptive of one or more pre-auction bidders 704 and pre-auction share price(s) 706. Another field can hold data descriptive of a reserve amount 708. Obviously, other data fields storing data utilized in various facets of the present invention can also be included. The data can be arranged and accessed using any known data storage and accessing techniques.

A number of embodiments of the present invention have been described. Nevertheless, it will be understood that various modifications may be made without departing from the spirit and scope of the invention. For example, multiple bids for auction price shares can be made, with each bid being for a different price and/or quantity. In addition, in some embodiments, a pre-auction bidder 104 may be precluded from bidding for auction price shares 103. Still other embodiments can include a risk management clearinghouse search on pre-auction bidders 104 and/or auction bidders 105 to help limit risks associated with any violation of regulations or fiduciary duties. Accordingly, other embodiments are within the scope of the following claims.

What is claimed is:

1. A computer implemented method of obtaining shares of stock comprising an initial public offering, the method comprising:
   receiving digital data into a memory on a computer system, the digital data comprising information descriptive of the initial public offering that includes pre-auction shares to be sold at a pre-auction price and auction shares to be sold at an auction to the highest bidder;
   receiving additional digital data into the memory in the computer system, the additional digital data comprising an offer for at least some of the pre-auction shares of the stock at the pre-auction price;
   receiving in the computer system, an indication of a number of the pre-auction shares available at the pre-auction price;
   indicating in the computer system, a number of the pre-auction shares to be purchased at the pre-auction price;
   indicating in the computer system, an acceptance to purchase the shares of stock offered at the pre-auction price; and
   publishing to participants of the auction, via the computer system the information descriptive of the initial public offering, the offer for the pre-auction shares of the stock, the number of the pre-auction shares that were available at the pre-auction price, the number of the pre-auction shares purchased at the pre-auction price, and instructions relating to bidding for auction shares.

2. The computer implemented method of claim 1, wherein the number of shares available at the pre-auction price is based on market conditions and investor interest.

3. The computer implemented method of claim 1, further comprising setting a reserve price for the initial public offering.

4. The computer implemented method of claim 1, wherein the auction allows bidding until each participant has placed a bid.

5. The computer implemented method of claim 1, wherein the auction allows bidding until a cutoff time.

6. The computer implemented method of claim 1, wherein the pre-auction price is determined by an underwriter of the stock.

7. The computer implemented method of claim 1, wherein the auction allows bidding until a cutoff time.

8. The computer implemented method of claim 1, wherein the pre-auction price is determined by an underwriter of the stock.

9. A processor-implemented method comprising:
   offering via a processor a subset of shares comprising an initial public offering to one or more pre-auction bidders at a pre-auction price;
   receiving an indication via a processor from the one or more pre-auction bidders accepting the offer for the shares at the pre-auction price;
   determining if any shares of the initial public offering remain to be sold; and
   offering, via an auction, the shares of the initial public offering that remain to a set of auction bidders, wherein the offering includes publishing via a processor information comprising the pre-auction price and the pre-auction bidders accepting the offer for shares at the pre-auction price.

10. The processor-implemented method of claim 9, further comprising determining the one or more pre-auction bidders by pre-qualifying a set of bidders.

11. The processor-implemented method of claim 9, wherein the subset of shares comprising the initial public offering includes all offered shares.

12. The processor-implemented method of claim 9, wherein the subset of shares available at the pre-auction price is based on market conditions and investor interest.

13. The processor-implemented method of claim 9, further comprising setting a reserve price for the initial public offering.

14. The processor-implemented method of claim 9, wherein the auction allows bidding until each bidder in the set of auction bidders has placed a bid.

15. A non-transitory computer-readable medium containing instructions that when executed by one or more processors:
   receive digital data comprising information descriptive of an initial public offering that includes pre-auction shares to be sold at a pre-auction price and auction shares to be sold at an auction to the highest bidder;
   receive additional digital data comprising an offer for at least some of the pre-auction shares of the stock at the pre-auction price;
   receive an indication of a number of the pre-auction shares available at the pre-auction price;
   indicate a number of the pre-auction shares to be purchased at the pre-auction price;
   indicate an acceptance to purchase the shares of stock offered at the pre-auction price; and
   publish to participants of the auction, the information descriptive of the initial public offering, the offer for the pre-auction shares of the stock, the number of the pre-auction shares that were available at the pre-auction price, the number of the pre-auction shares purchased at the pre-auction price, and instructions relating to bidding for auction shares.

16. The non-transitory computer-readable medium of claim 15, wherein the number of shares available at the pre-auction price is based on market conditions and investor interest.

17. The non-transitory computer-readable medium of claim 15, wherein the instructions when executed set a reserve price for the initial public offering.

18. The non-transitory computer-readable medium of claim 15, wherein the auction allows bidding until each participant has placed a bid or until a cutoff time.

19. The non-transitory computer-readable medium of claim 15, wherein the pre-auction price is determined by an underwriter of the stock.

20. The non-transitory computer-readable medium of claim 15, wherein the instructions when executed also determine the one or more pre-auction bidders by prequalifying a set of bidders.

\* \* \* \* \*